United States Patent [19]

Ulveling

[11] Patent Number: 4,593,727
[45] Date of Patent: Jun. 10, 1986

[54] APPARATUS AND METHOD FOR CONTROLLING THE CONTENTS AND THE FILLING OF A DISTRIBUTION TANK FOR PULVERIZED MATERIALS

[75] Inventor: Léon Ulveling, Howald, Luxembourg

[73] Assignee: Paul Wurth S.A., Luxembourg, Luxembourg

[21] Appl. No.: 628,237

[22] Filed: Jul. 6, 1984

Related U.S. Application Data

[63] Continuation of Ser. No. 435,311, Oct. 19, 1982, abandoned.

[30] Foreign Application Priority Data

Oct. 19, 1981 [LU] Luxembourg ............................ 83701

[51] Int. Cl.$^4$ ............................................ B65G 53/00
[52] U.S. Cl. ...................................... 141/5; 177/151; 177/244; 277/34.3; 406/25
[58] Field of Search ................... 141/18, 83, 312, 367, 141/388, 37.5; 177/145, 162, 151, 244; 277/34, 34.3; 406/23-25, 32; 222/56, 58, 77; 285/97

[56] References Cited

U.S. PATENT DOCUMENTS

| | | | |
|---|---|---|---|
| 2,369,823 | 2/1945 | Freed | 277/34.3 |
| 3,707,172 | 12/1972 | Obara | 141/83 X |
| 3,773,221 | 11/1973 | Lesk et al. | 222/77 X |
| 4,180,272 | 12/1979 | Heitz | 277/34.3 |
| 4,212,331 | 7/1980 | Beratar | 141/83 |
| 4,469,152 | 9/1984 | Hardee et al. | 285/97 X |
| 4,488,837 | 12/1984 | Mizokawa | 222/77 X |

FOREIGN PATENT DOCUMENTS

| | | | |
|---|---|---|---|
| 510312 | 4/1952 | Belgium | 222/56 |
| 1315386 | 5/1973 | United Kingdom | 406/25 |

Primary Examiner—Stephen Marcus
Assistant Examiner—Mark Thronson
Attorney, Agent, or Firm—Fishman & Dionne

[57] ABSTRACT

This invention presents apparatus and a method for controlling the contents and the filling of a distribution tank for pulverized material. The apparatus and method include structure for and the steps of weighing the distribution tank and an intermediate tank and structure for and the steps of sealing the connection between the tanks for transfer of material and separating the tanks for weighing.

17 Claims, 2 Drawing Figures

APPARATUS AND METHOD FOR CONTROLLING THE CONTENTS AND THE FILLING OF A DISTRIBUTION TANK FOR PULVERIZED MATERIALS

This application is a continuation of application Ser. No. 435,311 filed Oct. 19, 1982, abandoned.

BACKGROUND OF THE INVENTION

This invention relates to apparatus and a method for controlling the contents and the filling of a distribution tank for pulverized materials. More particularly, this invention relates to apparatus and a method for controlling the contents and the filling of a distribution tank for pulverized material to deliver the pulverized material under pressure to a shaft furnace, such as, for example, a blast furnace.

Apparatus and methods have previously been proposed for delivering pulverized material, e.g., coal or lignite, to a blast furnace for fuel. Such apparatus and methods involve controlling the contents and the filling of a distribution tank for pulverized materials. The distribution tank operates under pressure and is provided, on its downstream side, with a series of apertures for the extraction of the pulverized material; and the distribution tank is connected, on its upstream side, to an intermediate pulverized material supply tank which serves as an air lock. The intermediate tank is alternately vented and brought under pressure substantially equal to or higher than the pressure in the distribution tank; and it is alternately isolated from and brought into communication with the distribution tank, by operation of two valves.

By way of illustration, but not limitation, apparatus and methods of this type designed for injecting powdered coal or lignite into a blast furnace are disclosed in published European Patent Application Ser. No. 0 021 222 and in U.S. Patent Applications Ser. Nos. 158,612 and 247,511 (all of which are owned by the assignee hereof, and the entire disclosures of which are incorporated herein by reference). In such systems the powdered coal or lignite is extracted through the bottom of the distribution tank by way of the extraction apertures, which may be provided with cellular rotor type blast air locks, and is then carried pneumatically to each of the tuyeres of the blast furnace and injected into the blast furnace.

In order to ensure continuous injection, the level of pulverized material in the distribution tank must be permanently monitored, so that it can be filled when its contents fall below a predetermined minimum. Up to the present time this monitoring has been effected by means of level probes. However, these level probes, for example radiation probes, have the disadvantage of giving only a rather inaccurate indication of the quantity or weight of coal contained in the tank. Since determination of the proper amount of coal to be delivered to the blast furnace is affected by weight, it is desirable that the monitoring of the contents of the distribution tank should also be effected in accordance with the weight of the contents of the distribution tank. This is particularly so, since when monitoring in accordance with the filling level curve, a predetermined maximum or minimum level does not always correspond to the same weight of coal contained in the tank.

SUMMARY OF THE INVENTION

The above discussed and other problems of the prior art are overcome or reduced by the present invention which provides apparatus and methods for controlling the contents of distribution tanks for delivering pulverized material to a shaft furnace, such as a blast furnace. In accordance with the presnt invention, the monitoring of the contents of the distribution tank is based on the weight of the contents of the tank; and the distribution tank and the intermediare tank are alternately sealed together for transfer of material and separated for weighing.

In accordance with the present invention, the distribution tank and the intermediate tank both rest on balances (i.e., weighing cells) which produce signals corresponding to the weight of the contents of the tanks. Also, between the two tanks an adjustable seal is provided which makes it possible for the two tanks either to be connected together in fluid tight communication for material transfer, or to be completely disconnected from one another for weighing.

In a preferred embodiment of the seal structure, the seal is composed of an extensible rubber seal element mounted on a first connector extending from one of the tanks and disposed concentrically or coaxially in relation to a second connector extending from the other tank. Expansion or inflating means, such as a source of pressurized gas, are provided ror applying the extensible seal into fluid tight engagement with the second connector. The second connector, against which the extensible seal is applied, may be disposed inside or outside the first connector. The first connector may be fastened to the distribution tank or to the intermediate tank.

Other features, characteristics and advantages of the present invention will be apparent to and understood by those skilled in the art from the detailed description of the preferred embodiment of the invention which is set forth below by way of illustration and with reference to the drawings.

BRIEF DESCRIPTION OF THE DRAWINGS

Referring now to the drawings.

DESCRIPTION OF THE PREFERRED EMBODIMENT

Figure 1:
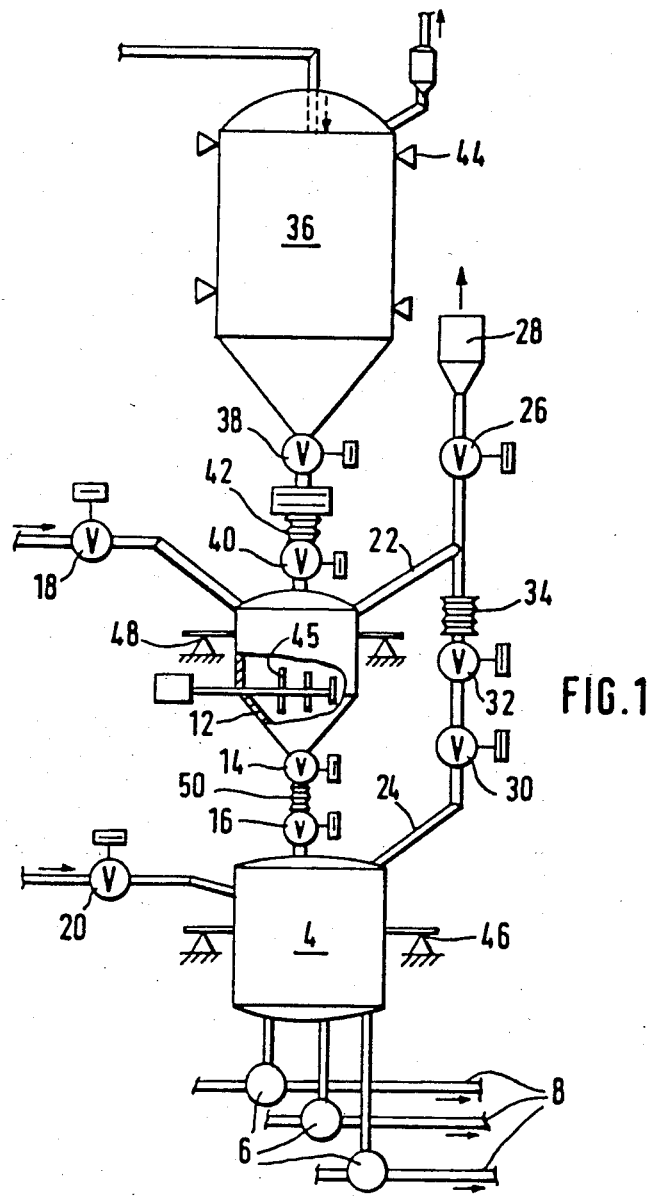
FIG. 1 is a schematic view of the apparatus of the present invention.

Referring first to FIG. 1, a general description will be set forth of the overall apparatus and method of operation. Distribution tank 4 is a tank in which pulverized material, in the present case powdered coal or lignite, is stored for the purpose of injection into a shaft furnace (not shown), for example a blast furnace. The pulverized material is extracted from tank 4 by way of a series of cellular rotor type blast air locks 6, while transport to and injection into the blast furnace are effected pneumatically (as indicated by the arrows) through pipes 8 fed with a propellant fluid, for example compressed air (from a source not shown).

Tank 12 is an intermediate air lock tank serving to fill the tank 4. Flow communication between tank 12 and tank 4 is established through a pair of valves 14 and 16, which may be controlled automatically by a control system detecting the contents of the tanks 4 and 12, as will be explained in more detail hereinafter. Valve 14 is at the exit from tank 12, and valve 16 is at the inlet to tank 4.

The tanks 12 and 4 are connected to compressed air sources (indicated by the arrows, but not otherwise shown) by way of automatic valves 18 and 20 respectively, in order to ensure the pressure necessary in these two tanks. These two tanks 12 and 4 are also provided with vent pipes 22 and 24 respectively, which lead into a common vent pipe provided with a common automatic valve 26 and a filter 28. The pipe 24 also contains two automatic valves 30 and 32, as well as a compensator 34.

Tank 36 is a storage tank for the pulverized coal from which the intermediate air lock tank 12 is filled. Flow communication and isolation disconnection between these two tanks 36 and 12 are effected by two valves 38 and 40 with a compensator 42 between these valves. Valve 38 is at the exit from tank 36 and valve 40 is at the inlet to tank 12. Maximum and minimum level probes 44 monitor and control the level of filling of coal in storage tank 36.

As explained in detail in the previously referenced United States and European patent applications, material from storage tank 36 is transferred to intermediate tank 12. Tank 12 is then isolated from tank 36 and from tank 4 and tank 12 is pressurized; tank 12 is then connected to tank 4 to transfer the material to tank 4; and from tank 4 the material is then delivered under pressure to the blast furnace.

In order to ensure the quickest possible filling of the tank 4, the present invention incorporates a mixing device 45 in the tank 4. This mixing device 45 is operated automatically when the contents of the tank 12 are transferred to the tank 4.

In order to achieve permanent control and monitoring of the contents of tanks 4 and 12, these tanks are mounted or suspended on weight detecting elements or balances 46 and 48, respectively, which permanently supply indications, for example in the form of electric signals, of the weight of the contents of each of these two tanks. For each of these two tanks 4 and 12 three balances or weighing detecting cells are preferably provided (although only 2 may be seen at each tank in FIG. 1). The weight detectors may be pressure detectors or extensometers or other devices, all of which are well known in the art.

In order to be able to obtain accurate weights for the contents of the tanks 4 and 12, and without the measurements being falsified by the pressures, it is necessary for these two tanks 4 and 12 to be completely separable for independent weighing; but the tanks must also be in fluid tight communication for transfer of material. These dual objectives are achieved by use of an extensible seal 50, which is located between the two valves 14 and 16 (and which is described in more detail hereinafter with reference to FIG. 2). For the same reasons, it is necessary that tank 12 be isolatable or separable from the tank 36. This separation or isolation is effected by a compensator 42. Although it is possible to also provide an extensible seal similar to the seal 50 between tanks 36 and 12, it is sufficient in this case to provide a simple bellows type compensator. This is so because compensator 42 will always be under substantially atmospheric pressure, whereas the pressure between the two valves 14 and 16 may attain 5 to 6 bars, a pressure level for which bellows type compensators are unsuitable. Compensator 42 permits fluid tight communication between tank 36 and tank 12, while permitting tank 12 to be isolated or separated from tank 36 for weighing purposes. The compensator 34 in the pipe 24 has the same functions as the extensible seal 50 and the compensator 42 in the sense that it achieves fluid tight communications in pipe 24 while separating the pipe portions above and below the compensator for weighing.

A brief description will now be given of the operation of the system shown in FIG. 1. It will first be assumed that the tank 4 is in the course of being emptied (i.e., its contents are being delivered to a blast furnace) and that it is isolated from the tank 12 by the closing of the valves 14 and 16. At the same time, tank 12 is in the filling phase. Tank 4 is also isolated from the atmosphere by the valves 30 and 32 being closed. Valve 20 is open and maintains inside tank 4 a sufficient pressure to entrain the pulverized material into the pipes 8. If the pressure should exceed a predetermined threshhold inside the tank 4, the valves 30 and 32 will open automatically in order to bring the pressure back to the set value.

During the emptying phase of the tank 4, the tank 12 is at atomospheric pressure and is in communication by way of the open valves 38 and 40 with the tank 36 for the purpose of filling tank 12. During the filling of the tank 12, pressurizing valve 18 is closed, while vent valve 26 is open. When the tank 12 is full, which is signalled by the weight detectors or balances 48, the valves 26, 38 and 40 are closed, and valve 18 is then opened to place tank 12 under a pressure slightly higher than that prevailing in the tank 4.

When the weight of the contents of tank 4 falls below a predetermined threshhold, which is sensed and signalled by the weight detectors or balances 46, the mixing device 45 is put into operation, and the valves 14, 16, 18, 30 and 32 are opened and the valve 20 is closed. From that moment onwards the contents of tank 12 are transferred into tank 4 within a minimum period of time through the action of the pressurized air supply from valve 18. It should be noted that during the filling phase of tank 4 the pulverized material continues to be transferred into the pipes 8 under the action of the pressure maintained by the valve 18. The excess, if any, of compressed air effecting the transfer of the pulverized material from tank 12 to tank 4 can be recycled through the valves 30 and 32 into the tank 12.

As soon as the contents of the tank 12 have been transferred to tank 4, which is determined and signalled by the weight detectors or blances 48, valves 14, 16, 18, 30 and 32 are closed, mixing device 45 is stopped, and valve 26 is opened to vent tank 12. The valves 20, 38 and 40 are thereupon opened in order to repeat the cycle described above. Opening and closing of the various valves and operation of mixer 45 may be effected manually or automatically in response to the weight signals from weight detectors or balances 46 and 48.

Figure 2:
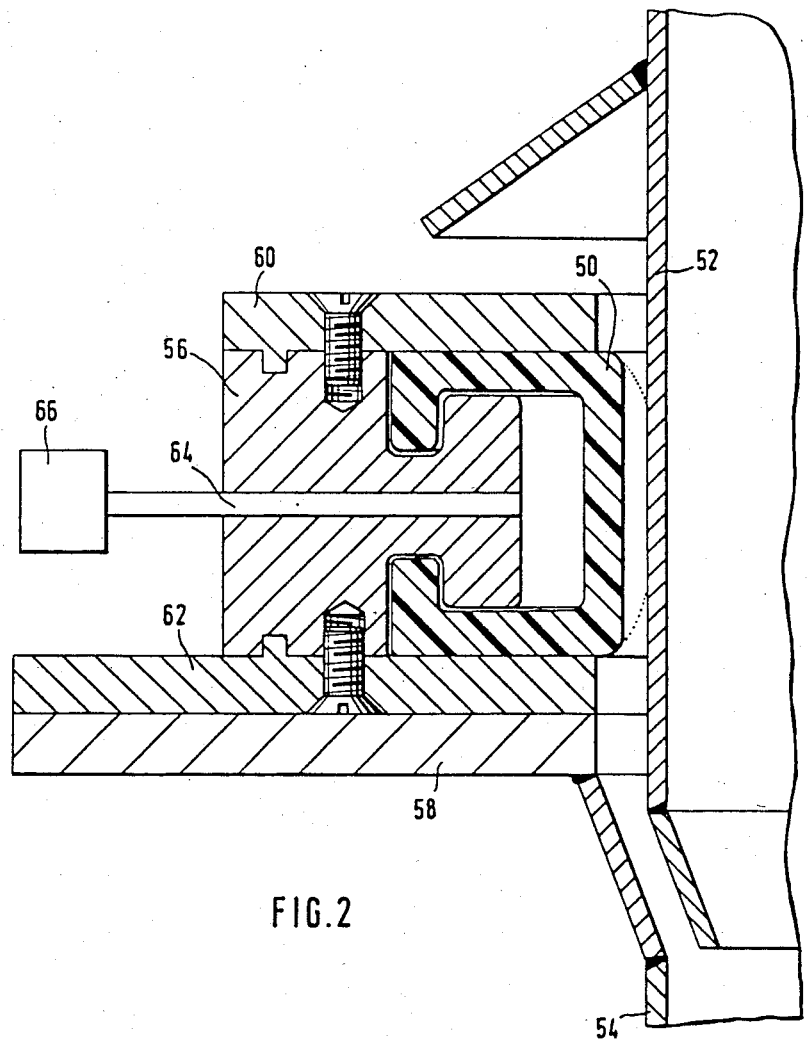
FIG. 2 is a partial schematic vertical section through an extensible seal of the present invention.

FIG. 2 shows the details of the extensible seal 50 which makes it possible to selectively obtain both (1) leak tight connection and flow and (2) separation for weighing between the cylindrical or annular connectors 52 and 54 respectively fastened to the exit from tank 12 and the inlet tank 4 (more precisely, to the exit from valve 14 and the inlet to valve 16). As shown in FIG. 2, this seal is an extensible rubber seal. It is an annular element having a U-shaped cross-section; and it is engaged in an annular block 56 which is detachably fastened to a flange 58 mounted on the connector 54. Two annular plates 60 and 62 detachably fixed on the block 56 hold the seal 50. As shown, flange 58 and plates 60 and 62 are coaxial with and spaced from connector 52.

The interior of the seal 50 (i.e., the space between block 56 and the seal) is in communication by way of a pipe 64, which passes through the block 56, with a source 66 of pressurized gas, which may be argon. The pressure of this gas is about 4 bars above the pressure prevailing inside tank 4. The interior of the seal 50 can also be vented through this same pipe 64 by means (not shown) which may consist of a simple valve.

When the seal 50 is vented, it has the shape shown in solid lines in FIG. 2, so that the connector 54 is separated from and independent of the connector 52 and the space bounded by connectors 52 and 54 and the two valves 14 and 16 is under atmospheric pressure. In this mode, tanks 4 and 12 are separated or isolated from each other for weighing purposes.

Before the valves 14 and 16 are opened to establish flow communication between the tank 12 and the tank 4, the interior of the seal 50 is inflated by the action of the compressed gas from source 66 which may be actuated manually or automatically in coordination with the weight signals from elements 46 and/or 48. The seal in the inflated state is shown in dotted lines in FIG. 2. In this position seal 50 is applied in fluid tight engagement against the connector 52 and ensures a sealed and leak tight connection between tanks 4 and 12.

Instead of the arrangement shown in FIG. 2, it is also possible to mount the seal on the inner connector 52 and to apply the seal, by inflation, against the outer connector 54. In addition, depending on the ease of mounting, the seal may be mounted either on the upper connector 52 or on the lower connector 54, as is the case in FIG. 2.

From the foregoing, it will be seen and understood that the present invention achieves novel and effective apparatus and methods for monitoring the weight of pulverized material delivered to a blast furnace, by providing for both accurate weight measurement and fluid tight flow communication.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a system for controlling the contents and filling of a distribution tank for pulverized material, which distribution tank operates under pressure, the pressure being above atmospheric pressure, and which is connected on its downstream side to receiving apparatus for the pulverized material and on its upstream side to an intermediate pulverized material supply tank which is alternatively vented and pressurized to a level equal to or higher than the pressure in the distribution tank, the intermedite tank being selectively connected into flow communication to deliver pulverized material to the distribution tank and selectively connected out of flow communication with the distribution tank, the improvement comprising:
first weighing means for weighing the contents of the distribution tank and producing a control signal commensurate with the weight of said contents;
second weighing means for weighing the contents of the intermediate tank and producing a control signal commensurate with the weight of the intermediate tank contents, said first and second weighing means being respectively indpendent of each other;
valve means for controlling the flow of pulverized material from said intermediate tank to said distribution tank in accordance with said signals;
expandable seal means between said intermediate tank and said distribution tank, said seal means having a first mode in which fluid tight connection is effected between said intermediate tank and said distribution tank and having a second mode in which said intermediate tank and said distribution tank are substantially isolated from each other for weighing purposes; and
first connector means extending from said itnermediate tank and second connector means extending from said distribution tank, said first and second connector means forming a flow path between said tanks;
said expandable seal means being mounted on one of said connector means and being selectively movable into and out of engagement with the other of said connector means.

2. The system of claim 1 wherein:
said connector means are coaxial; and
said expandable seal means is exterior of said other connector means.

3. The system of claim 1 including:
pressurized gas means for selectively expanding said seal means into engagement with said other connector means.

4. The system of claim 1 wherein:
said connector means are coaxial with said second connector means being exterior of said first connector means; and
said seal means is mounted on said second connector means.

5. The system of claim 4 including:
pressurized gas means for selectively expanding said seal means into engagement with said first connector means.

6. The system of claim 1 wherein:
said connector means are coaxial; and
said seal means includes an annular expandable element.

7. The system of claim 6 wherein:
said connector means are coaxial with the second connector being exterior of the first connector; and
said annular expandable seal element is mounted on said connector and surrounds said first connector.

8. The system of claim 6 including:
pressurized gas means for selectively expanding said seal means into engagement with said first connector means.

9. The system of claim 4 wherein said seal means includes:
mounting means on said second connector;
a pair of annular plates on said mounting means; and
an annular seal block positioned between said plates;
said expandable element being connected to said seal block.

10. The system of claim 7 including:
pressurized gas means for selectively expanding said seal means into engagement with said first connector.

11. The system of claim 1 including:
mixing means in said intermediate tank.

12. The system of claim 1 wherein:

operation of said mixing means is coordinated with said signals.

13. The system of claim 1 wherein:
operation of said seal means is coordinated with said signals.

14. In a method for controlling the contents and filling of a distribution tank ofr pulverized material, which distribution tank operates under pressure, the pressure being above atmospheric pressure, and is connected on its downstream side to receiving apparatus for the pulverized material and on its upstream side ot an intermediate pulverized material supply tank which is alternately vented and pressurized to a level equal to or higher than the pressure in the distribution tank, the intermediate tank being selectively connected into flow communication to deliver pulverized material to the distribution tank and selectively connected out of flow communication with the distribution tank, the steps of:
weighing the contents of the distribution tank and producing a control signal commensurate with the weight of said contents;
independently weighing the contents of the intermediate tank and producing a control signal commensurate with the weight of the intermediate tank contents;
controlling the flow of pulverized material from said intermediate tank to said distribution tank in accordance with said signals; adjusting an expandable seal means between said intermediate tank and said distrubtion tank to position said seal means in a first mode in which fluid tight connection is effected between said intermediate tank and said distribution tank and a second mode in which said intermediate tank and said distribution tank are substantially isolated from each other for weighing purposes, said expandable seal means being mounted on one of said first and second connector means:
forming a flow path between said distribution and intermediate tanks via first connector means extending from said intermediate tank and second connector means extending from said distribution tank;
selectively moving said expandable seal means into and out of engagement with the other of said connector means.

15. The method of claim 14 including the step of:
introducing pressurized gas to said seal means to selectively expand said seal means.

16. The method of claim 14 including the step of:
mixing the material in the intermediate tank in coordination with said signals.

17. The method of claim 14 wherein:
operation of said seal means is coordinated with said signals.

* * * * *